Jan. 25, 1938.    O. OHNESORGE    2,106,358
ROPE TRANSMISSION
Filed April 28, 1934    4 Sheets-Sheet 1

Inventor:
Otto Ohnesorge
By B. Singer, Atty.

Jan. 25, 1938. O. OHNESORGE 2,106,358
ROPE TRANSMISSION
Filed April 28, 1934 4 Sheets-Sheet 2

Inventor:
Otto Ohnesorge

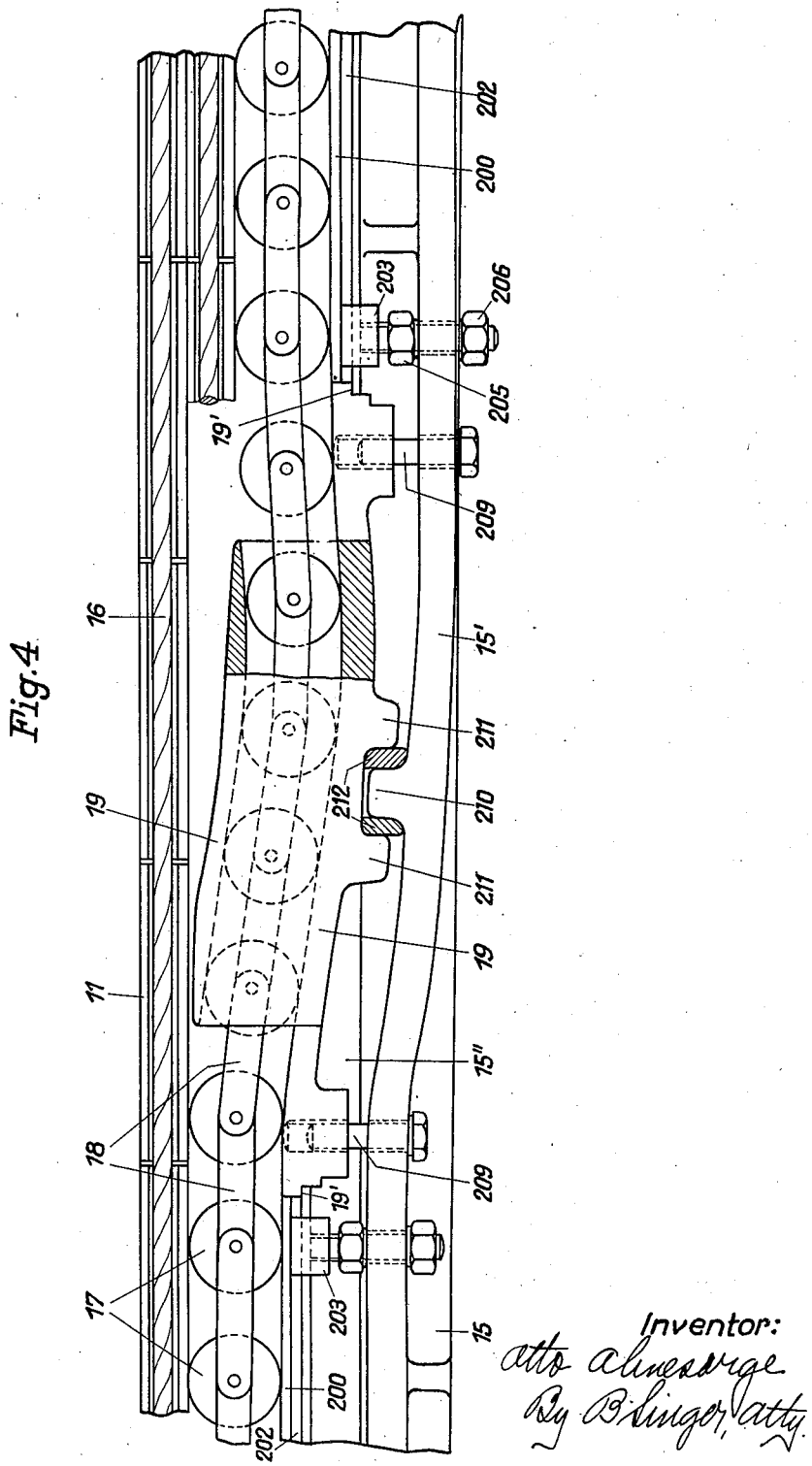

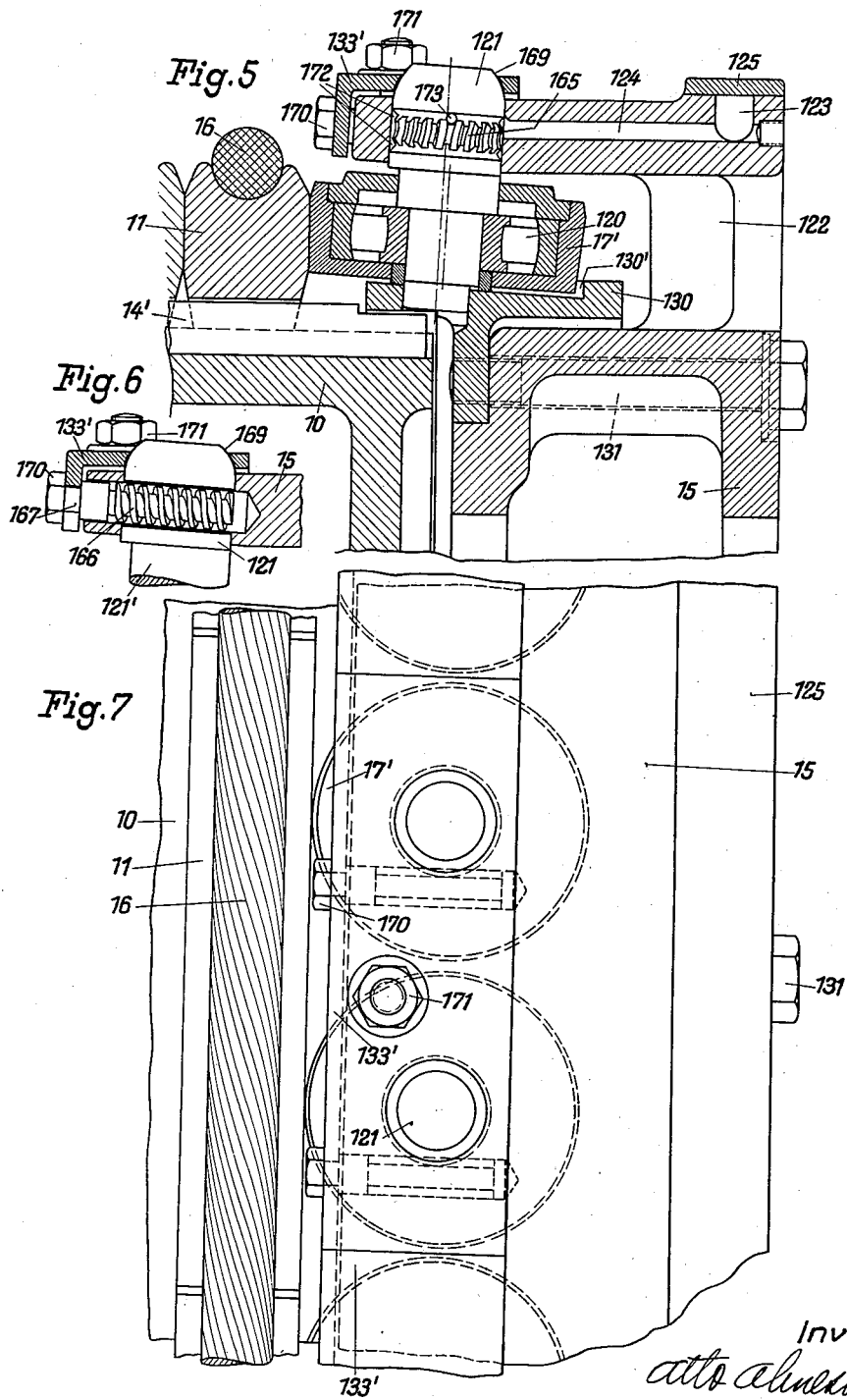

Patented Jan. 25, 1938

2,106,358

UNITED STATES PATENT OFFICE 2,106,358

ROPE TRANSMISSION

Otto Ohnesorge, Bochum, Germany

Application April 28, 1934, Serial No. 722,949
In Germany January 2, 1933

14 Claims. (Cl. 74—224)

The invention relates to pulleys for use in connection with hoisting, hauling and power transmission, that is to say pulleys of the kind in which the rope or chain is coiled round the pulley, making a complete turn or turns on its circumference, and running upon an endless grooved chain, which is likewise coiled helically upon the pulley and is traversed to allow rewinding at one end of the coil the chain that runs off at the other end. The traversing of this grooved chain is effected by means of a stationary deflector giving the requisite lateral, bias to the chain, and to reduce friction a roller chain is interposed between the traversing chain and the deflector, or the deflector itself is made in the form of a series of rollers.

The action of the deflector depends of course, on the same having a helical or nearly helical configuration, and according to my invention provision is made for adjusting the pitch of the helix, either as a whole or locally. In practice it is generally not possible to determine in advance precisely what pitch or helical configuration will give the best result, because the deflector does not operate uniformly round the complete circumference, there being a gap (say about 60°) between the termination of the first coil and the beginning of that coil, due to the fact that the chain for forming the first coil is a kind of return loop starting at the opposite side, and a margin of clearance must be left for it to find its way to the ordered helical path. Hence the pitch of the deflecting helix must be somewhat greater than the pitch of the coils, but it is desirable that the excess should not be greater than is essential.

By making the pitch of the deflecting helix adjustable one is enabled to regulate it to suit requirements at the time of installing the gear, or after trial, and one can make changes to suit changing conditions. Moreover, an important advantage is that less precision is required in designing and constructing the deflector as local corrections can be made in situ. The possibility of local correction is also important in view of the fact that the wear of the deflector is not uniform.

The invention is illustrated in the accompanying drawings showing two forms of construction.

Fig. 4 is a plan view, to a smaller scale, showing the part at which the helical deflecting track diverges from the highest to the lowest point.

Fig. 5 is a cross section of the second form of construction, in which the helical deflecting track is formed by a series of rollers.

Fig. 6 is a detail view appertaining to Fig. 5.

Fig. 7 is a plan view of Fig. 5, and

Figure 1:
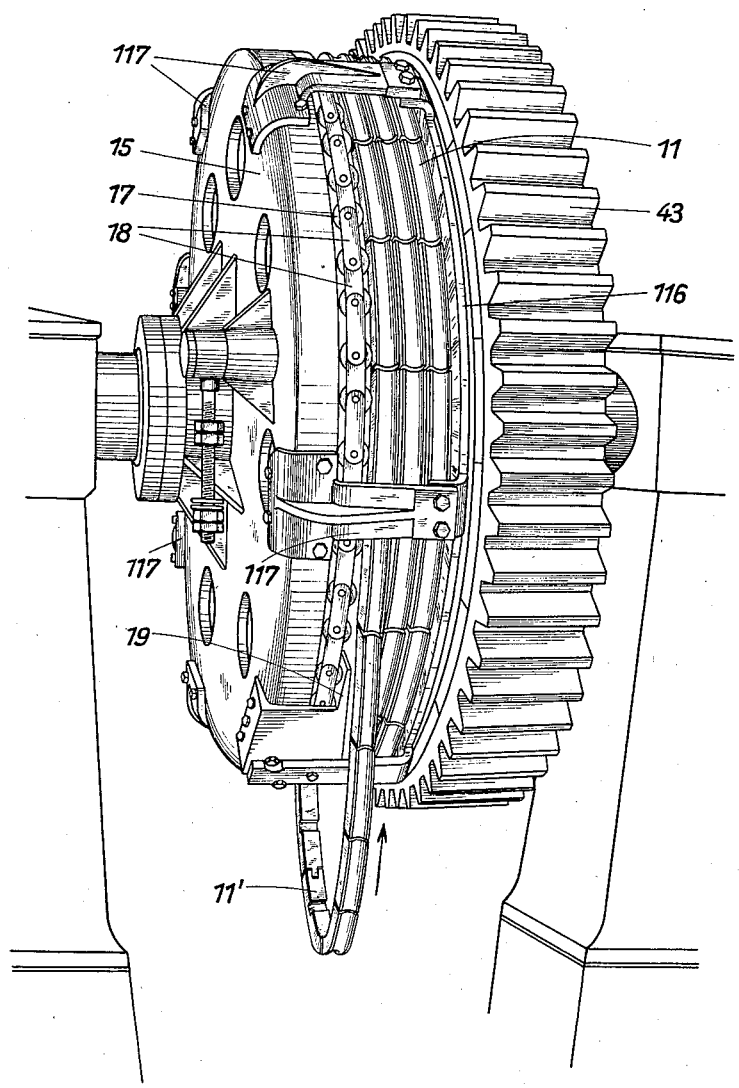
Fig. 1 is a perspective view of a pulley of the kind to which the invention relates.

Fig. 1 shows a pulley designed for rotation in one direction only. The pulley is fixed to a gear wheel 43 and has coiled thereon an endless grooved rope-traversing chain composed of links 11. Part of this chain forms a pendent loop 11' crossing from the left to the right hand side of the coil. The pulley rotates in the direction indicated by the arrow, and deflection of the oncoming chain 11 is effected by a deflecting member 15 with the aid of an interposed roller chain having rollers 17 and links 18. This roller chain makes an S-shaped bend from the highest point of the helical deflector 15 to the lowest point, the bend being produced by a member 19 (see Fig. 4). A helically twisted flange 116 supported by curved brackets 117 fixed to the deflecting member 15 serves to guide the coils at such times as the rotation of the pulley may be temporarily reversed for some particular purpose.

Figure 2:
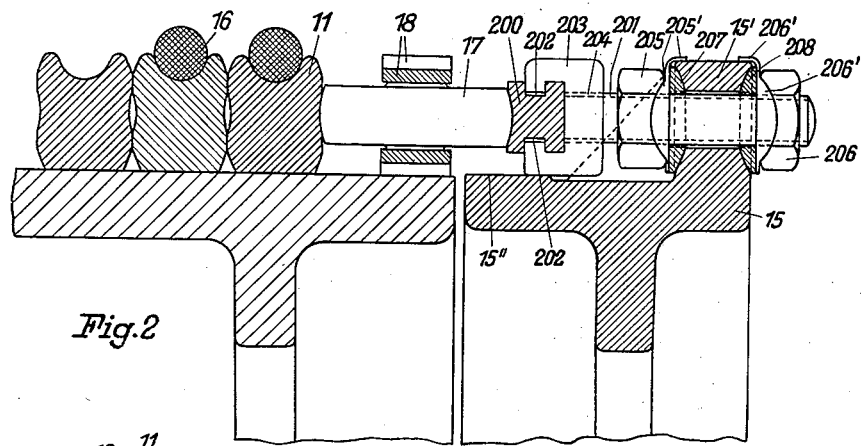
Figs. 2 and 3 are cross sections showing the lowest and highest parts of the helical deflecting track according to one form of construction.
Figure 3:
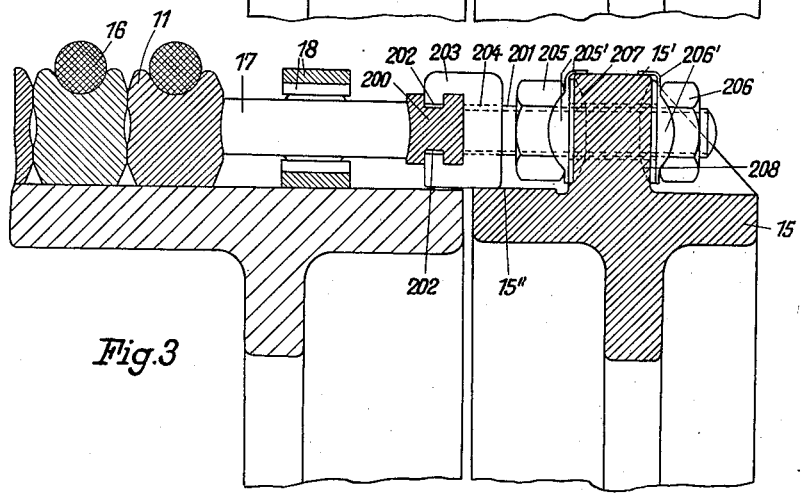
Figure 8:
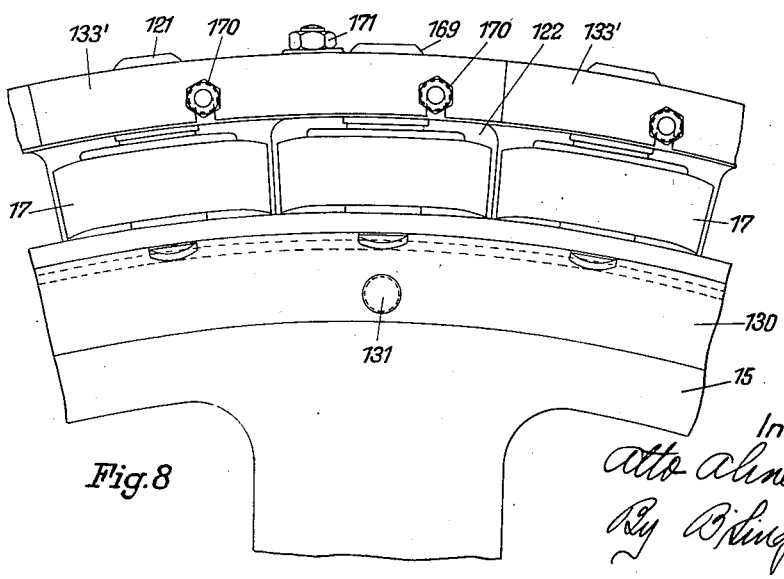
Fig. 8 is a fragmentary front elevation of the helical deflecting track.

According to Figs. 2 to 4 the deflecting member 15 has connected thereto a track ring 200, which forms a circle except that there is a gap for the guide 19. Jaws 203 engage grooves 202 in the ring 200 and are thrust against the ring by screw bolts having threads 201. The bolts are connected to a flange 15' of the deflecting member 15 by nuts 205, 206, with interposed rounded washers 207, 208. The flange 15' extends round the otherwise cylindrical member 15 in the form of a helix corresponding approximately to that of the chain coil. The desired adjustment is effected by seating the jaws 203 on the cylindrically machined face 15'' of the deflecting member 15. The member 19, which may be a casting, fits with its stepped ends 19', 19' between the correspondingly shaped ends of the ring 200, against which it is held tightly by means of screws 209, whilst the member 19 is secured against circumferential movement by lugs 211 engaging a projection 210 on the flange 15', wooden wedges 212 or their equivalents being interposed between said lugs and projection.

With this construction the helical deflector can be made of any suitable material, such as steel, accurately machined as a ring in a lathe, both as regards the actual track for the rollers 17 and in respect of the grooves 202. The track thus formed may be accurately adjusted in respect of its pitch as a whole, and in respect of its axial position. For instance, starting from the member 19 it may be given an increasing pitch up to the centre opposite the guide member and thence continued with a gradually reduced pitch. This may be done at the time of assembling the parts, and repeated while the pulley is in service, the screws 205, 206 being locked by means of lock washers 205' and 206' after adjustment.

The stepped ends of the ring 200 enable the member 19 to adjust itself automatically when the ring is adjusted, and the slight torque exerted on the deflecting track is taken by the lugs 211 and wedges 212. The ring itself is made of such material, and is so shaped, that it can be bent to the desired helical pitch without excessive stressing and without using excessive force, but it is sufficiently rigid to guide the deflecting rollers without appreciably yielding between consecutive supporting points.

In the construction shown in Figs. 5 to 8 the same principle of adjustment of the deflector as a whole and locally is adopted in respect of a series of stationary deflecting rollers 17', the rollers being capable of individual adjustment and being also readily renewable. The chain coil 11 providing the grooved track for the rope 16 is engaged with ribs 14' on the pulley 10 and travels in contact with rollers 17', which are revolubly mounted on studs 121 on the deflecting member 15. To enable these rollers 17' to be placed on the studs, and removed again if required for changing them, there are apertures 122 in the rear wall of the deflecting member 15. For the first rough adjustment of the track rollers of different diameters are selected and placed in the appropriate order in the series.

To enable fine adjustment to be effected the rollers are mounted eccentrically on the studs 121, so that their position can be adjusted by turning the studs. The turning of a stud is effected by first loosening the nut 171, so that the pressure of the lock plate 133' on the spherical head 169 of the stud 121 and on the neck 167 of the adjusting screw 170 is removed, and then turning the screw 170 so that the thread 166 thereof co-operates with a worm 165 on the member 121 to rotate the stud. When the adjustment has been made, the nut 171 is tightened up, so that the stud is locked against rotation.

The inner end of the stud 121 is preferably provided with a bearing member in the form of a ring 130 detachably secured by a screw 131 to the deflecting member 15, the latter being preferably in the form of a casting. The object of this is to enable the wall to be made thin, the bearing 130 being a steel ring so that the ribs 14' in the pulley 10 may project adequately without having unduly to increase the height of the chain links. It also enables the bores for the inner ends of the studs 121 to adjust themselves when the ring 130 is released, and the cut recesses 130', which are provided in view of the inclined position of the rollers 17', may be conveniently formed. This inclined position of the rollers, and their conical form, ensures a precise rolling action, and small inaccuracies are advantageously compensated by bearings 120. Lubrication of the roller bearings is preferably effected by a common annular groove 123 formed in the member 15 and covered by a ring 125, with transverse bores 124 leading from the groove to the several studs. Grooves 172 adjacent the worm wheel teeth 165 and bores 173 conduct the lubricant through a central bore (not shown) and branch conduits to the rollers 120.

What I claim is:

1. A friction drive comprising a pulley, a tension element trained over the pulley, a track chain helically positioned on the pulley and supporting the tension element, a deflector structure for the track chain having a plurality of anti-friction members engaging a helix of the track chain at circumferentially spaced points, and means acting upon the anti-friction members of said deflector structure and adapted to vary the pitch of the helix formed by the track chain engaging points of said anti-friction members.

2. A friction drive comprising a pulley, a tension element trained over the pulley, a track chain helically positioned on the pulley and supporting a tension element, a deflector structure for the track chain having a series of anti-friction members engaging a helix of the track chain at circumferentially spaced points, connecting means for the members of the series and means acting upon the anti-friction members of said deflector structure and adapted to vary the pitch of the helix formed by the track chain engaging points of said anti-friction members, said last named anti-friction members being independent of the connecting means.

3. A friction drive comprising a pulley, a tension element trained over the pulley, a track chain helically positioned on the pulley and supporting the tension element, a deflector for the track chain having an operative stationary surface in opposition to a helix of the track chain, said operative surface being also helical, and means for adjusting the pitch of the helical surface of the deflector.

4. A friction drive comprising a pulley, a tension element trained over the pulley, a track chain helically positioned on the pulley and supporting the tension element, a deflector for the track chain having an operative stationary surface in opposition to a helix of the track chain, said operative surface also being helical, a series of anti-friction members interposed between the helical deflector surface and the track chain, and means for adjusting the pitch of the helical surface of the deflector.

5. A drive assembly comprising a pulley, a tension element trained over the pulley, an endless track chain helically positioned on the pulley and supporting the tension element, a deflector for the track chain having a stationary surface in opposition to a helix of the track chain, said operative surface also being helical, a series of anti-friction members interposed between the helical deflector surface and the track chain, said anti-friction members being interconnected and being in their entirety movable circumferentially of the pulley, and means for adjusting the helical surface of the deflector differentially at circumferentially spaced points.

6. A drive assembly comprising a pulley, a tension element trained over the pulley, a track chain helically positioned on the pulley and supporting the tension element, a deflector for the track chain, the deflector including a ring member, an annular support for the same, means on the annular support for differentially constraining the ring member axially to cause said ring member to assume a helical form, and a series of anti-friction members interposed between said ring member and the opposite helix of the track chain.

7. A drive assembly, comprising a pulley, a tension element trained over the pulley, a track chain helically positioned on the pulley and supporting the tension element, and a deflector for the track chain, said deflector including a ring member, an annular support for the same, means on the annular support for differentially constraining the ring member to cause the same to assume a helical shape having axially offset ends, a series of anti-friction members between said ring member and the opposite helix of the track chain, and a cam connecting the axially offset ends of the ring member.

8. A drive assembly, comprising a pulley, a tension element trained over the pulley, a track chain helically positioned on the pulley and supporting the tension element, and a deflector structure for the track chain, said structure including a ring member, an annular support for the same, means on the annular support for differentially constraining the ring member axially to convert said ring member into a helical member having axially offset ends circumferentially spaced from each other, a cam connecting said ends of the ring member, and means for locking said cam against circumferential movement with respect to said support.

9. A drive assembly comprising a pulley, a tension element trained over the pulley, a track chain helically positioned on the pulley and supporting the tension element, a deflector structure for the track chain, including a plurality of rollers, and an annular support for said rollers, and independently operable means for maintaining said rollers in engagement with the track chain.

10. A drive assembly comprising a pulley, a tension element trained over the pulley, a track chain helically positioned on the pulley and supporting the tension element, and a deflector structure for the track chain, said deflector structure including a plurality of rollers, an annular support for the rollers, and independently operable means for maintaining the rollers in engagement with the track chain, the rollers being provided with shafts having portions eccentric to the axis of the rollers, which portions are rotatably supported in said annular support.

11. A drive assembly comprising a pulley, a tension element trained over the pulley, a track chain helically positioned on the pulley and supporting the tension element, and a deflector structure for the track chain, said deflector structure, including a plurality of rollers, the diameters of which are not uniformly the same, and an annular support for said rollers adapted to hold the rollers of different diameters in engagement with the track chain.

12. A drive assembly comprising a pulley, a tension element trained over the pulley, a track chain helically positioned on the pulley and supporting the tension element, and a deflector structure for the track chain, said deflector structure comprising a plurality of rollers, an annular support common to all of said rollers and adapted to hold said rollers in engagement with a helix of the track chain, said annular support being provided with openings permitting the axial removal and insertion of said rollers from and to operative position respectively.

13. A drive assembly comprising a pulley, a tension element trained over the pulley, a track chain helically positioned on the pulley and supporting the tension element, and a deflector structure for the track chain, said deflector structure including a plurality of rollers, an annular support common to all of said rollers and adapted to maintain said rollers in engagement with a helix of the track chain, shafts for the rollers carried in the annular support, and removable locking means common to a plurality of rollers for maintaining said rollers in operative position on the support.

14. A drive assembly comprising a pulley, a tension element trained over the pulley, a track chain helically positioned on the pulley and supporting the tension element, and a deflector structure for the track chain, said deflector structure comprising a plurality of rollers, an annular support common to all of said rollers and adapted to hold said rollers in engagement with a helix of the track chain, said annular support being provided with a circumferential groove and with passages extending within the support from said groove to the rollers, and an annular cover for said groove, whereby upon introduction of lubricant into the groove all of the rollers may be lubricated.

OTTO OHNESORGE.